US009773337B2

(12) United States Patent
Delplace

(10) Patent No.: US 9,773,337 B2
(45) Date of Patent: Sep. 26, 2017

(54) THREE DIMENSIONAL ANIMATION OF A PAST EVENT

(71) Applicant: Trimble Inc., Sunnyvale, CA (US)

(72) Inventor: Jean-Charles Delplace, Longueil Sainte Marie (FR)

(73) Assignee: Trimble Inc., Sunnyvale, CA (US)

( * ) Notice: Subject to any disclaimer, the term of this patent is extended or adjusted under 35 U.S.C. 154(b) by 309 days.

(21) Appl. No.: 14/448,266

(22) Filed: Jul. 31, 2014

(65) Prior Publication Data
US 2016/0035120 A1 Feb. 4, 2016

(51) Int. Cl.
G06T 13/00 (2011.01)
G06T 15/70 (2006.01)
G06T 13/20 (2011.01)
G06T 19/20 (2011.01)
B66C 13/48 (2006.01)
B66C 13/46 (2006.01)
B66C 15/06 (2006.01)
G06F 9/44 (2006.01)

(52) U.S. Cl.
CPC ............. *G06T 13/20* (2013.01); *G06T 19/20* (2013.01); *B66C 13/46* (2013.01); *B66C 13/48* (2013.01); *B66C 15/06* (2013.01); *G06F 8/10* (2013.01); *G06T 2210/21* (2013.01); *G06T 2219/2012* (2013.01)

(58) Field of Classification Search
CPC ............. G06T 13/20; G06T 2219/2012; G06T 2210/21; G06T 19/20; B66C 15/06; B66C 13/46; B66C 13/48; G06F 8/10
See application file for complete search history.

(56) References Cited

U.S. PATENT DOCUMENTS

| 7,637,166 | B2 * | 12/2009 | Hecht | E02D 5/22 73/803 |
| 2006/0146048 | A1 * | 7/2006 | Wright | G01C 23/00 345/419 |
| 2009/0082949 | A1 * | 3/2009 | Petrie | B60T 7/22 701/119 |

OTHER PUBLICATIONS

Kamat et al, Visualizing Simulated Construction Operations in 3D, Journal of Computing in Civil Engineering / Oct. 2001 /, 329-337.*
Al-Hussein et al., Integrating 3D visualization and simulation for tower crane operations on construction sites, Dec. 2005, 554-562.*

* cited by examiner

Primary Examiner — Robert Craddock
(74) Attorney, Agent, or Firm — Kilpatrick Townsend & Stockton

(57) ABSTRACT

Methods and systems are disclosed for rendering a three dimensional animation of a past event. A request is received, at a processor, for re-creation of a past event associated with a job site. Input data is accessed, at the processor, regarding the past even associated with the job site wherein the input data pertains to past movements and lifts of at least one lifting device associated with the job site. A three dimensional (3D) animation is generated, at the processor, of the past event involving the past movements of the at least one lifting device. The 3D animation is displayed, on a display, depicting the past event wherein the displaying comprises playback controls for controlling the displaying.

34 Claims, 10 Drawing Sheets

THREE DIMENSIONAL ANIMATION OF A PAST EVENT

BACKGROUND

Lifting devices, such as cranes, are employed to hoist or lift objects to great heights. A plurality of lifting device may be employed at locations such as a construction site. The construction site may have many different obstacles that impede lifting objects such as equipment, beams, lumber, building material, etc. The cranes may swivel or pivot about a pivot point to allow the cranes to lift and move objects into position. In large construction projects efficiency becomes increasingly important. During operation of the crane, events may occur such as collisions between objects.

BRIEF DESCRIPTION OF THE DRAWINGS

The accompanying drawings, which are incorporated in and form a part of this application, illustrate and serve to explain the principles of embodiments in conjunction with the description. Unless noted, the drawings referred to this description should be understood as not being drawn to scale.

DESCRIPTION OF EMBODIMENT(S)

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Unless specifically stated otherwise as apparent from the following discussions, it is appreciated that throughout the present description of embodiments, discussions utilizing terms such as "receiving", "generating", "accessing", "sending", "displaying", "rendering", or the like, often refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology are also well suited to the use of other computer systems such as, for example, mobile communication devices.

The discussion below begins with a general overview of embodiments. The discussion follows with a description of a tower crane system and a luffer crane (See FIGS. 1A and 1B) and an environment inclusive of a crane (See FIG. 2), in accordance with an embodiment. Following, different types of view for a display depicting a three dimensional (3D) animation of a past event (See FIGS. 3A, 3B, and 3C) is described, in accordance with embodiments. Following, a view for a display depicting a three dimensional (3D) animation of a past event with safety bubbles (See FIG. 4) is described, in accordance with embodiments. Then, an example GNSS receiver upon which embodiments of the present technology may be implemented (See FIG. 5) is described. Then, an example computer system upon which embodiments of the present technology may be implemented (See FIG. 6) is described. A flowchart of a method for a three dimensional animation of a past event (See FIG. 7) is shown, in accordance with embodiments.

Overview

Figure 1A:
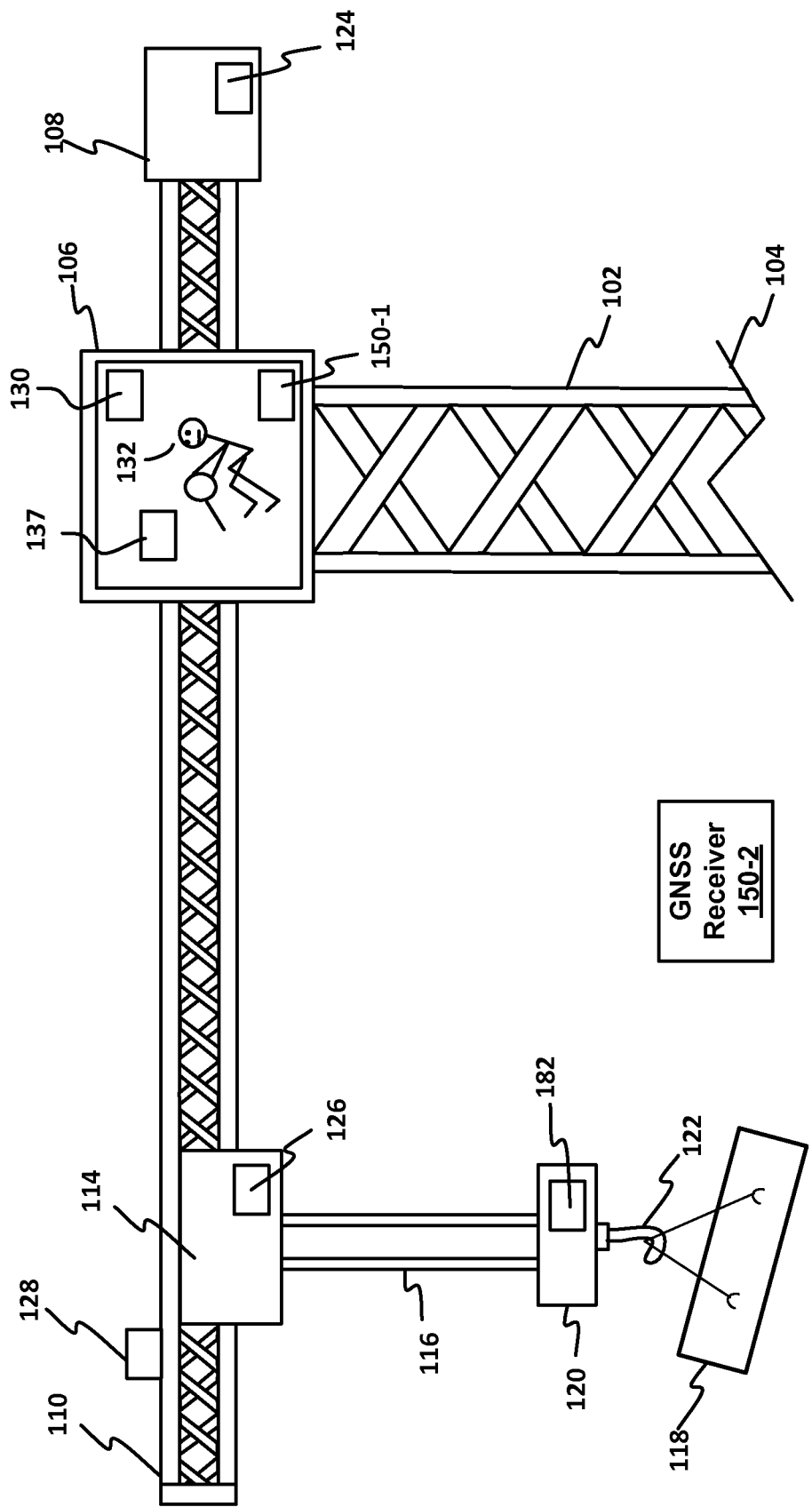
FIG. 1A is a block diagram of a tower crane system in accordance with embodiments of the present technology.
Figure 1B:
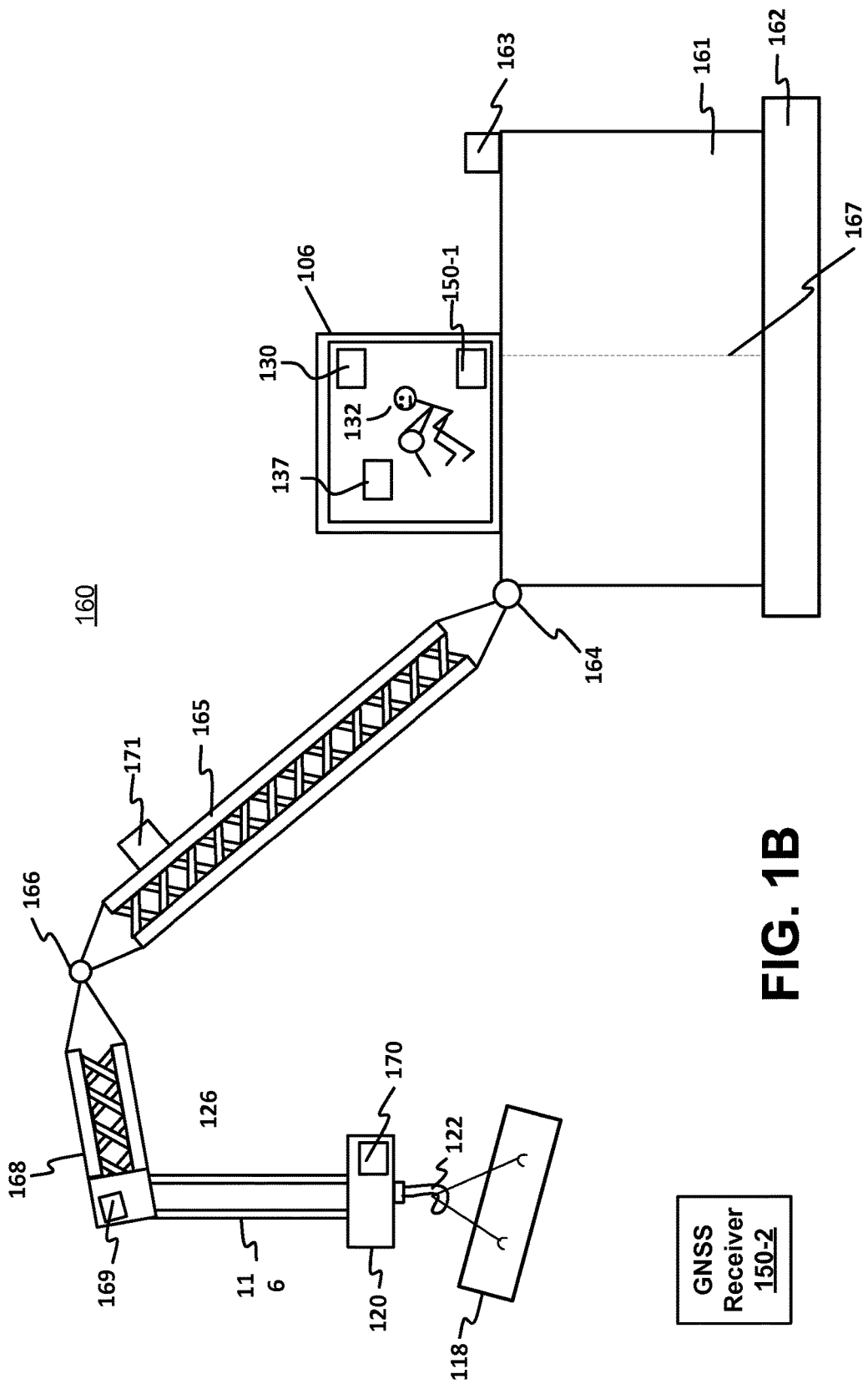
FIG. 1B is a block diagram of a crane system in accordance with embodiments of the present technology.

Embodiments described herein are for three dimensional re-creation of a past event. This includes rendering or simulating a past event involving a lifting device associated with a job site that lifts objects and moves them around the job site. The re-creation may be rendering a 3D animation of a past event where the rendering is occurring for the first time or may be a replay of a previous rendering. The 3D animation may also be referred to as a simulation. The lifting device may be a crane that is a large, tall machine used for moving heavy objects, typically by suspending them from a projecting arm or beam. Non-limiting examples of cranes are the tower crane and the luffer crane, as is shown in FIGS. 1A and 1B, as well as described herein. These cranes are used for, among other things, constructing buildings or other structures. The present technology is not limited to cranes but may also include other lifting devices such as forklifts and may also pertain to a job site with no lifting devices. A job site may comprise a plurality of lifting devices and at least one partially constructed building. The job site may have a staging area where objects are stored before the lifting device moves them into place on the partially constructed building.

In one embodiment, the job site is complex with many different moving parts and activities occurring simultaneously. Moreover, the goal, such as to build a building, may be complex and comprise many moving parts. With so many moving parts combined with large heavy equipment and objects, as well as many different personnel working at the site, accidents may occur. A moving object such as a lifting device may collide with another moving device or a stationary object. The collision may include a portion of the lifting device or the object being lifted by the crane. Other events may occur that do not necessarily involve collisions, such as procedures or maneuvers of the lifting device that are against protocol or safety precautions. There may be value in viewing the event after it occurs. One solution is to view video footage of the event. However, video footage may not provide a desired vantage point. Additionally, it is expensive to maintain cameras and video footage especially for a plurality of cameras.

The present technology offers an alternative to video footage by re-creating the past event via a three dimensional (3D) animation of the past event. The 3D animation is generated based on input data gathered by sensors associated with the job site. The sensors may be a variety of different type of sensors including, but not limited to, location sensors such as GNSS antennas or receivers, image receiving devices such as cameras, radio frequency identification receivers or emitters, mechanical sensors, optical sensors, radar, light sensors, motion detectors, or a combination thereof. The input data is used to render a 3D animation which is a representation of objects in the job site such as the environment itself such as trees and other vegetation, natural landscape such as dirt, rocks, and boulders as well as lifting devices, cranes, fork lifts, equipment, machinery, people, building materials, partially constructed buildings, etc. The 3D animation may be dynamic and show movements of objects in the animation such as a video. In one embodiment, the 3D animation is generated and displayed in real time. Typically items in a job site are constantly changing shape, size, or position, and may be in motion during a lift. The animation can be recorded or not.

After an event occurs a request may be submitted to view the event as a 3D animation. The request may come from a crane operator, a manager, a foreman, or anyone else. After receiving the request, the 3D animation of the past event is generated. The generating may be accessing a previous that was made prior to the request. For example, the live 3D animation that occurred in real time may have been recorded or stored and then accessed. In one embodiment, the 3D animation of the past event may have been previously rendered as a simulation or animation but is not stored or recorded so the 3D animation of the past event is re-rendered after the request is received. In one embodiment, no 3D animation of the past event was previously rendered and a first rendering of the past event occurs in response to the request. The input data from the sensors associated with the job site may be stored for the purpose of re-creating the 3D animation of the past event. The input data may be stored or retrieved from a Building Information Modeling (BIM) database.

To compensate for the complexity, each lifting device associated with the job site may have a lift plan. In one embodiment, the lift plan is a schedule of tasks for a given lifting device to accomplish in a particular order. The task may be to lift and move an object from one location to another. The order of tasks in the lift plan may be important. For example, a first object may need to be moved to the partially constructed building and installed before a second object is moved to the partially constructed building and installed. Additionally, a job site with more than one lifting device may have different types of lifting devices that have different features and capabilities. For example, a first lifting device may be able to lift a first type of objects but a not a second type of objects whereas a second lifting device may be able to lift both the first and second type of objects.

The re-creation or playback of the 3D animation of the past event may be displayed with playback controls. The playback controls may allow the viewer of the 3D animation to control the playback such as pause, stop, speed up, slow down, zoom in or out, toggle between different vantage points, or toggle between the playback and a real-time live 3D animation of what is currently happening the job site.

The 3D animation of the past event may display shaded or highlighted regions that highlight or point out collisions or near collisions. The shaded regions may be described as alerts to warn of an impending collision and may ultimately highlight an actual collision that occurred during the past event. The shaded regions may be described as safety bubbles. The 3D animation of the past event may include other types of alerts to warn of potential collisions such as audible alarms.

The 3D animation of the past event may be employed for various purposes. In one embodiment, the past event may be an accident that damaged property or caused injury to a person. The 3D animation may then be used to determine or identify what, if anything, went wrong. In this example the 3D animation may be useful in determining liability for an accident. The 3D animation may also be used to determine what went wrong and then use that information to prevent the accident from reoccurring. In one embodiment, the 3D animation may be used for training purposes. The crane operator may be shown the 3D animation so that the crane operator can learn from his or her own actions. The 3D animation may also be shown to other crane operators for training purposes. The 3D animation of a past event may also be requested to show what was done right or correctly in a past event.

It should be appreciated that the present technology is not limited to job sites, lifting device, or cranes but may operate in and be useful in any environment where it is valuable to generate a 3D animation of a past event. The present technology may be used with equipment other than a lifting device or a crane such as a forklift or excavating equipment. It should also be appreciated that the present technology may be implemented with a variety of cranes including, but not limited to, a tower crane, a luffing crane, a level luffing crane, a fixed crane, a mobile crane, a self-erecting crane, a crawler crane, and a telescopic crane.

Three Dimensional Re-Creation of a Past Event

With reference now to FIG. 1A, an illustration of a side view of a tower crane 100 is presented, according to various embodiments. Tower crane 100 is a lifting device and may also be referred to as a horizontal crane.

Tower crane 100 includes a base 104, a mast 102 and a working arm (e.g., jib) 110. The mast 102 may be fixed to the base 104 or may be rotatable about base 104. The base 104 may be bolted to a concrete pad that supports the crane or may be mounted to a moveable platform. In one embodiment, the operator 132 is located in a cab 106 which includes a user interface 137.

Tower crane 100 also includes a trolley 114 which is moveable back and forth on working arm 110 between the cab 106 and the end of the working arm 110. A cable 116 couples a hook 122 and hook block 120 to trolley 114. A counterweight 108 is on the opposite side of the working arm 110 as the trolley 114 to balance the weight of the crane components and the object being lifted, referred to hereinafter as object 118. The boom assembly may be comprised of cab 106, counterweight 108, working arm 110, and trolley 114.

Tower crane 100 also includes sensors 124, 126, 128, and 130 which are capable of collecting data about tower crane 100 and the environment or worksite in which tower crane 100 is a part of. The sensors may be, but are not limited to, location sensors such as GNSS antennas or receivers, image receiving devices such as cameras, radio frequency identification receivers or emitters, mechanical sensors, optical sensors, radar, light sensors, motion detectors, or a combination thereof. It should be appreciated that tower crane 100 may employ only one sensor or any number of sensors, more or less than the sensors that are depicted by FIG. 1A. In one embodiment, sensors 124, 126, 128, and 130 are a plurality of sensors for gathering input data for a past event associated with a job site.

Figure 5:
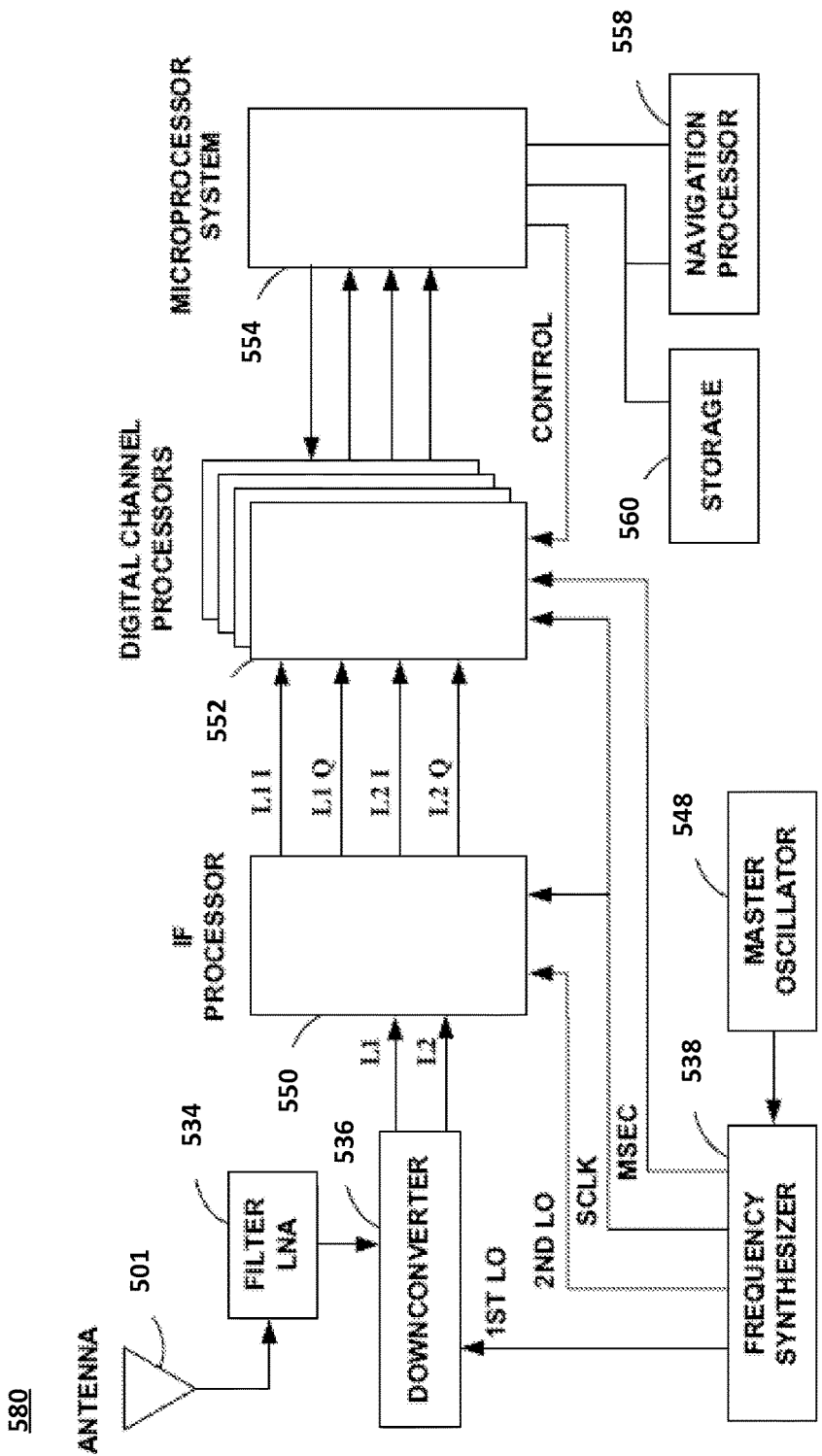
FIG. 5 is a block diagram of an example global navigation satellite system (GNSS) receiver which may be used in accordance with embodiments of the present technology.

In one embodiment, sensors 124, 126, 128, and 130 are GNSS receiver antennas each capable of receiving signals from one or more global positioning system (GPS) satellites and/or other positioning satellites, as is described in greater detail in reference to FIG. 5. Each of GNSS receiver antennas are connected to, coupled with, or otherwise in communication with a GNSS receiver. In one embodiment, the GNSS receiver (e.g., GNSS receiver 150-1) may be connected or coupled to tower crane 100. For example, any of GNSS receiver antennas may also include a separate receiver. In one embodiment, the present technology makes use of only one GNSS receiver antenna and one GNSS receiver. In one embodiment, the present technology makes use of a plurality of GNSS receiver antennas in communication with only a single GNSS receiver (e.g., GNSS receiver 150-1 or 150-2). In one embodiment, the present technology makes use of a plurality of GNSS receiver antennas in communication with a plurality of GNSS receivers. In one embodiment, the GNSS receiver (e.g., GNSS receiver 150-2) is located remote to tower crane 100 and is in communication with the GNSS receiver antenna/antennae on the crane via a coaxial cable and/or a wireless communication link.

In one embodiment, the present technology may determine locations in a local coordinate system unique to the construction site or environment. In one embodiment, the present technology may determine locations in an absolute coordinate system that applies to the whole Earth such as the coordinate system used by the Genesis system. The locations may be determined at the location sensors such as the GNSS receiver, or the location sensors may just send raw data to the central computer system where the location is determined based on the raw data.

In one embodiment, sensor 182 is a load sensor that is able to detect that tower crane 100 has picked up a load such as object 118. Sensor 182 is depicted as being coupled with or located on hook block 120. However, sensor 183 may be located on another part or component of tower crane 100 such as hook 122 or trolley 114. In one embodiment, sensor 182 is an ID sensor configured to automatically identify object 118. For example, object 118 may have an RFID chip and sensor 182 is an RFID detector or reader that can receive data from the RFID chip used to identify what type of object or material object 118 is. The data on the RFID chip may have data such as a model number, serial number, product name, characteristics of the product such as weight and dimensional, installation information, technical specifications, date of manufacture, point of origin, manufacturer name, etc. The RFID chip may also contain data that points sensor 182 to a database that comprises more data about object 118. In one embodiment, sensor 182 will not identify object 118 until it has feedback that object 118 has been loaded onto tower crane 100. In one embodiment, the load sensor triggers the locations sensors of tower crane 100 to send location data to the central computer system at the time the object is loaded on the crane and/or at the time the object is unloaded from the crane.

It should be appreciated that the various sensors of tower crane 100 such as load, location sensors, cameras, load sensors, or ID sensors may transmit or send data directly to a central computer system or may send data to a computer system coupled with and associated with tower crane 100 which then relays the data to the central computer system. Such transmissions may be sent over data cables or wireless connections such as Wifi, Near Field Communication (NFC), Bluetooth, cellular networks, etc. In one embodiment, the data from the sensors is employed to generate a 3D animation of tower crane 100 and the surrounding job site.

With reference now to FIG. 1B, an illustration of side view of crane 160 is presented, according to various embodiments. Crane 160 may also be referred to as a luffer crane or a level luffing crane. Crane 160 may comprise some of the components described for tower crane 100 of FIG. 1A. Crane 160 is a lifting device.

Base 161 is a base or housing for components of crane 160 such as motors, electrical components, hydraulics, etc. In one embodiment, structure 162 comprises wheels, tracks, or other mechanics that allow for the mobility of crane 160. In one embodiment, structure 162 comprises outriggers that can extend or retract and are used for the stability of crane 160. In one embodiment, structure 162 is a platform for a stationary crane. It should be appreciated that base 161 is able to rotate, swivel, or pivot relative to structure 162 along axis 167. Sensor 163 may be disposed on top of base 161 or may be disposed inside of base 161. Sensor 163 will move and rotate with base 161 about axis 167.

Pivot point 164 allows for lattice boom 165 to pivot with respect to base 161. In this manner, lattice boom 165 can point in different directions and change angle of pivot point 166. Pivot point 166 allows for jib 168 to pivot and change position with respect to lattice boom 165 and base 161. A location sensor may be attached to or coupled with any component of crane 160. For example, pivot points 164 and 166 may have a GNSS receiver antenna coupled to them. Sensors 130, 163, 169, 170, and 171 depict various locations a sensor may be located.

It should also be appreciated that the present technology may be implemented with a variety of cranes including, but not limited to, a tower crane, a luffing crane, a level luffing crane, a fixed crane, a mobile crane, a self-erecting crane, a crawler crane, and a telescopic crane.

Figure 2:
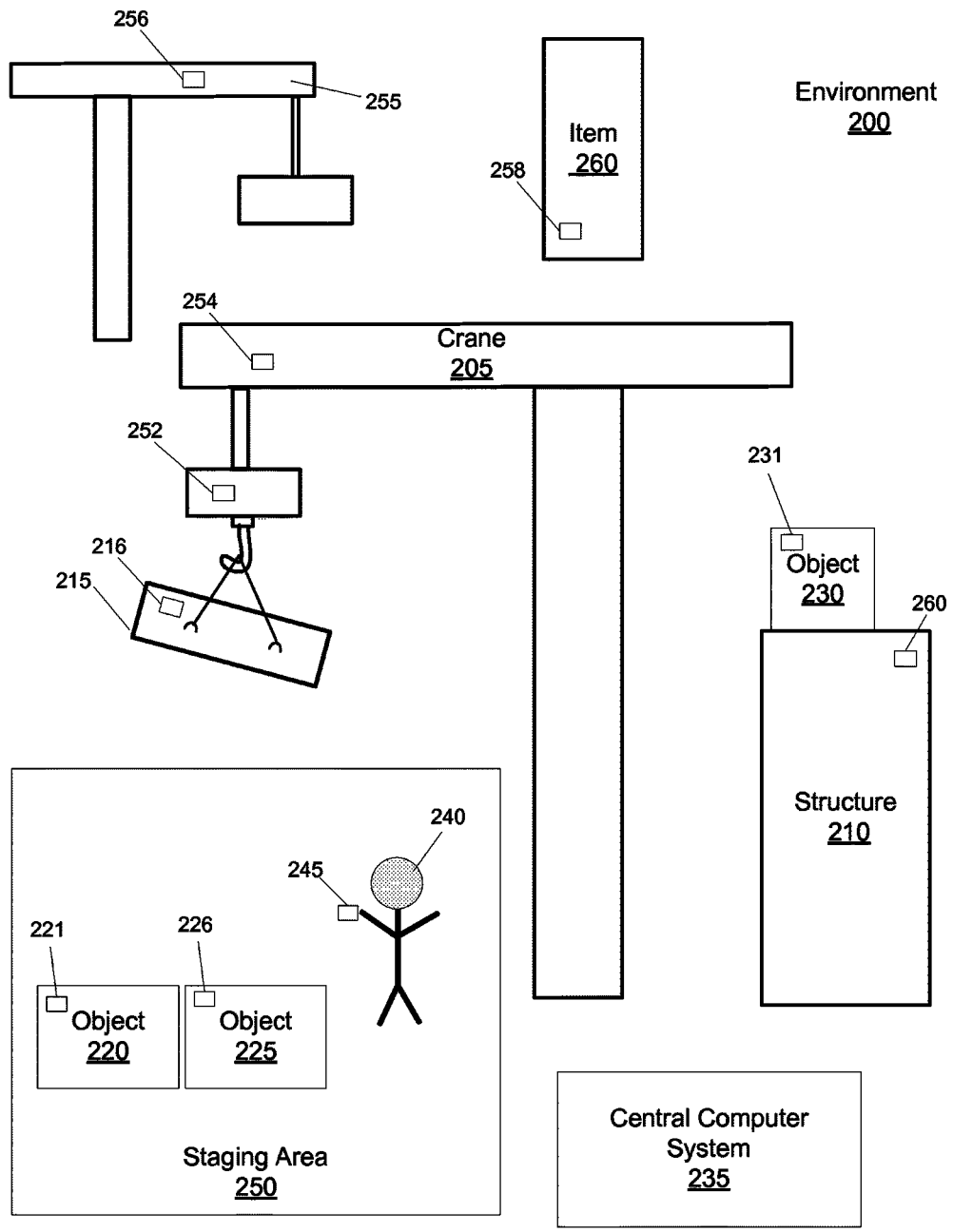
FIG. 2 is a block diagram of a job site with a crane in accordance with embodiments of the present technology.

With reference now to FIG. 2, an illustration of environment 200, in accordance with embodiments of the present technology. Environment 200 depicts a job site with crane 205 which comprises the features and components of the cranes described in FIGS. 1A and 1B. Environment 200 depicts a given vantage point. It should be appreciated that crane 205 and other items in environment may comprises sensors in accordance with embodiments of the present technology. Environment 200 may be a construction site, job site or other environment where large and heavy objects are lifted and moved by lifting devices such as crane 205. Crane 205 is capable of moving objects such as objects 215, 220, 225, and 230. Objects 215, 220, 225, and 230 may be building material or equipment used in the construction of structure 210. Structure 210 may be a building such as a sky scraper, office tower, house, bridge, overpass, road, etc. Objects 220 and 225 are depicts as being in staging area 250 where they have been delivered to be used in the construction environment. Object 215 is depicted as being lifted by crane 205. Object 230 is depicted as being delivered by crane 205 from the staging area to structure 210. Object 230 may already be installed in structure 210 or may be waiting to be installed in structure 210. Objects 215, 220, 225, and 230 may be different types of building materials or may be the same type.

Environments 200 also depicts second crane 255 which may have some or all of the same features and capabilities of crane 205. Crane 255 is depicted as having lifted an object. Crane 255 may be stationary or may be in motion. Item 260 is also depicted and may be any number of objects. Item 260 may be a naturally occurring object such as a rock, dirt, cliff, vegetation, tree, or may be a manmade structure such as a building, a partially built building, a vehicle, construction equipment, construction materials, etc. It should be appreciated that environment 200 may comprise any number of items, objects, structures, and cranes arraigned in any fashion and is not limited to what is depicted.

Various sensors are located in and associated with environment 200 and are depicted by sensors 216, 221, 226, 231, 252, 254, 256, and 258. In practice, each of the sensors may or may not be in environment 200 or there may be more sensors. The sensors may be, but are not limited to, location sensors such as GNSS antennas or receivers, image receiving devices such as cameras, radio frequency identification (RFID) receivers or emitters, mechanical sensors, optical sensors, radar, light sensors, motion detectors, or a combination thereof. The sensors are capable of collecting data and sending it to another location such as central computer system 235. The transfer of data may occur wirelessly or over wired connection. In one embodiment, the sensors transfer data to central computer system 235 in real time.

The data collected by the sensor may be data related to stationary objects or moving objects within environment 200. The data may be an image from a camera or other sensor that is analyzed by a processor to determine size, shape, and distance of objects and space between objects as well as the speed of moving objects. The data may be used to predict a path of travel of an object or item in environment 200. Location data may also be generated to determine where objects or items are located within environment 200 and where they are located relative to other objects or items. Measurement data may be received from the sensors or may be inferred by the processor based on other data from the sensors or a data. Measurement data may be exact or approximate.

In one embodiment, handheld device 245 is also a sensor or combination of sensors capable of collecting data. Handheld device 245 may use RFID chips, quick response code, or bar code scanning to identify objects as they are rigged or loaded onto crane 205. The data, or identity data of the objects, may include a model number, serial number, product name, characteristics of the product such as size, shape, weight, center of gravity, rigging or equipment needed to lift the object, where the object needs to be moved to on the job site, and other characteristics that may assist a crane operator or job site manager in planning and executing the lift of the identified object, installation information, technical specifications, date of manufacture, point of origin, manufacturer name, etc. The data may then be sent to a location such as central computer system 235. Handheld device 245 may a mobile computing device that is off the shelf or custom made.

In one embodiment, handheld device 245 is used by a rigger who is responsible for loading or rigging objects onto crane 205 to be lifted. In one embodiment, handheld device 245 is employed by a foreman or other personnel and is used to display the 3D animation. Person 240 may refer to either a rigger identifying an object or to a foreman viewing a 3D animation that may be of a past event or a real-time 3D animation.

The data collected by the various sensors may then be stored or be employed to render, create or generate a 3D animation of environment 200. The data may then be used later to recreate a past event in the form of a 3D animation. Other data may also be used to render the 3D animation. For example, a database such as a Building Information Modeling (BIM) system may be used to gather data to render the 3D animation. The data collected by the sensors may also be stored in the BIM. In one embodiment, an object is in environment 200 is identified via handheld device 245 and the identification is then sent to central computer system 235 which then downloads information from a BIM system regarding the size, shape, weight and other data pertaining to the identified object. This data is then used to render the 3D animation.

In one embodiment, the 3D animation depicts both stationary and moving objects in the job site. The 3D animation may be stored for later viewing and may be updated on a periodic basis or in real time. A partially built structure is always changing and growing and the crane operator may not be aware of new portions of the partially built structure that have been added recently. This may lead to an accident or other event that needs to be reviewed. The 3D animation may be displayed on a standard display usually associated with a computer system or may be specific use device and simulates the three dimensional nature of a job site. The 3D animation can depict the objects that were moved by crane 205 in the past event and show any objects, items, or other cranes that may be in the path of crane 205 and the object it was moving.

It should be appreciated that 3D animation is performed by hardware devices such as a computer processor. The 3D animation may be performed by one processor or by a plurality of processors. The plurality of processors may be associated with one computer or may be spread out and associated with many computers, for example cloud computing. The processor may be located in or coupled with the crane itself. For example, the cab of crane 205 may comprise a computer that is able to receive input data from all of the sensors as well as receive data from outside databases. The computer in the crane may then display the 3D animation in the cab and may or may not send the 3D animation to other computer systems or displays. In a different embodiment, a computer system not in or coupled with crane 205 performs the 3D animation and sends the 3D animation to a display associated with a decision maker and may also send the 3D animation to a display in the cab of crane 205. This other computer system may be central computer system 235 which may be located at environment 200 or located anywhere else in the world such that a decision maker may view the 3D animation while located at the job site or located remotely anywhere in the world.

In one embodiment, the 3D animation is sent to multiple displays or computer systems simultaneously. The multiple displays may be a display in the cab of crane 205, the display of a handheld or mobile computer system used by a person in environment 200, a stationary display such as one in a control center. The 3D animation may be sent to a display local to environment 200 or to a display anywhere in the world via a network. The 3D animation of the past event may be viewed by anyone including a foreman, a job site manager, a crane operator, a trainee, an investigator, an executive, etc. The 3D animation can be used for various purposes including determining human errors, investigating mistakes, training purposes, etc.

The user viewing the 3D animation of the past event may be able to toggle between multiple views or vantage points of the 3D animation. The different views offer an advantage to see the past event from views that may not be available to video footage that was recorded of the past event. The 3D animation may also be toggled between the 3D animation of the past event to view a 3D animation of what is currently happening in the job site in real-time.

Figure 4:
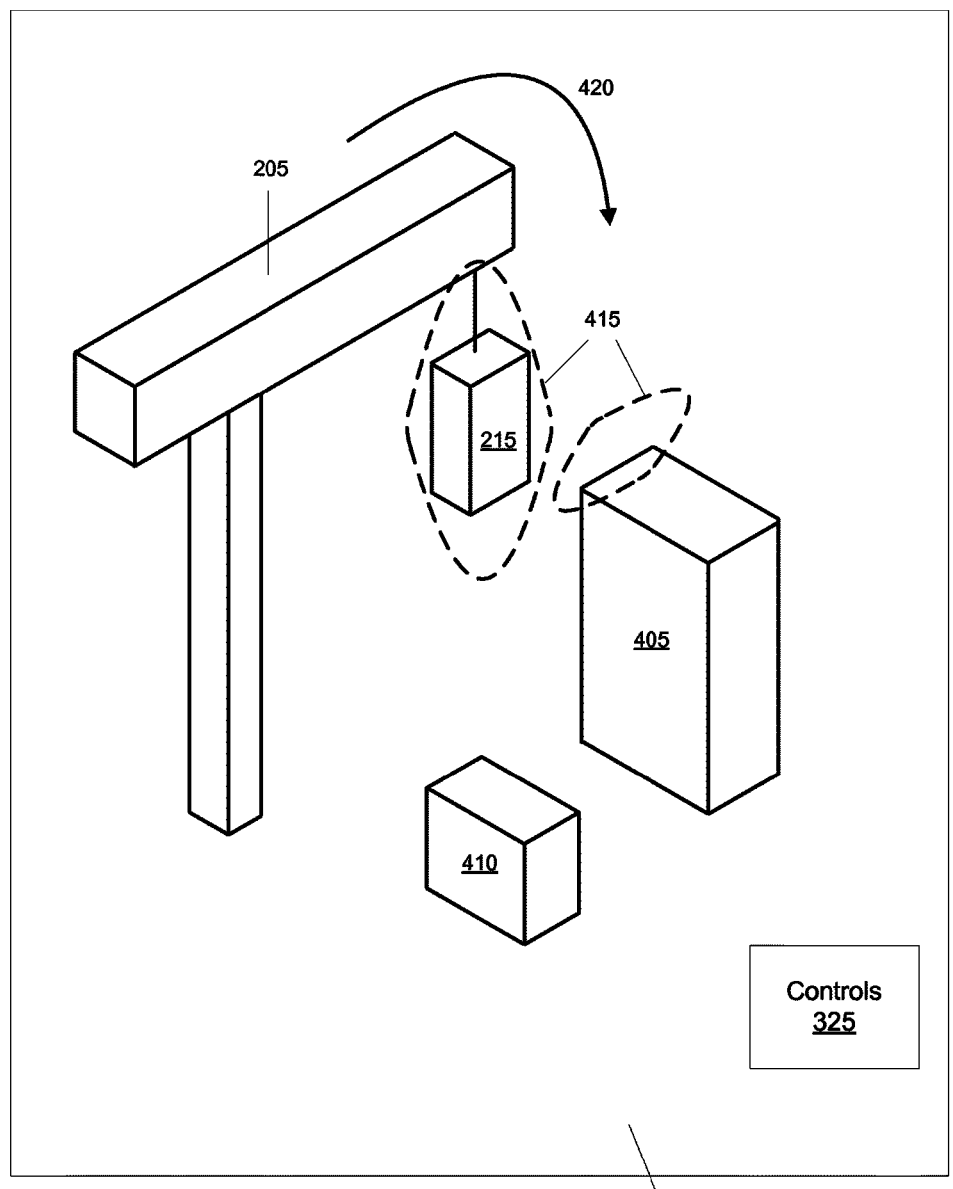
FIG. 4 is block diagram of a display showing a 3D animation of a view with safety bubbles in accordance with embodiments of the present technology.

In one embodiment, the 3D animation displays safety bubbles or highlights regions where a potential collision is possible or where a collision occurred during the past event. For example, crane 205 may need to move object 215 from staging area 250 to structure 210. However, the path of travel while lifting object 215 will cause object 215 to potentially collide with item 260. The safety bubble(s) displays this potential area of collisions and is depicted in FIG. 4.

With reference now to FIGS. 3A, 3B, 3C, and 4, each of these figures depicts a different view of a 3D animation of a job site being displayed on display 320. The 3D animation may be of a past event or of a current real-time event. Display 320 is a display associated with a computer system and may be a in the cab of a crane or may be a mobile or stationary computer system not in or coupled a crane. In one embodiment, display 320 is a touchscreen and may be manipulated by touching the screen. It should be appreciated that display 320 may be any type of display typically associated with computer system such as liquid crystal display (LCD) screens, plasma screens, projection screens, etc. Controls 325 depict controls associated with display 320 and the processor controlling what is displayed on display 320. The controls may be part of a touchscreen interface or may be physical buttons or switches. The controls may turn display 320 on or off or control standard features such as color, contrast, brightness, etc. In one embodiment, controls 325 control the 3D animation being displayed by display 320. For example, controls 325 may be used to zoom in a portion of the 3D animation or may be used to toggle between different views such as between views 300, 330, 340, and 400 of FIGS. 3A, 3B, 3C, and 4 respectively. In one embodiment, the controls are used to turn on and off various features such as the safety bubbles. The controls may also control the playback of a 3D animation showing a past event. The playback controls may be to control playback speed, zoom, pause, stop, etc.

Figure 3A:
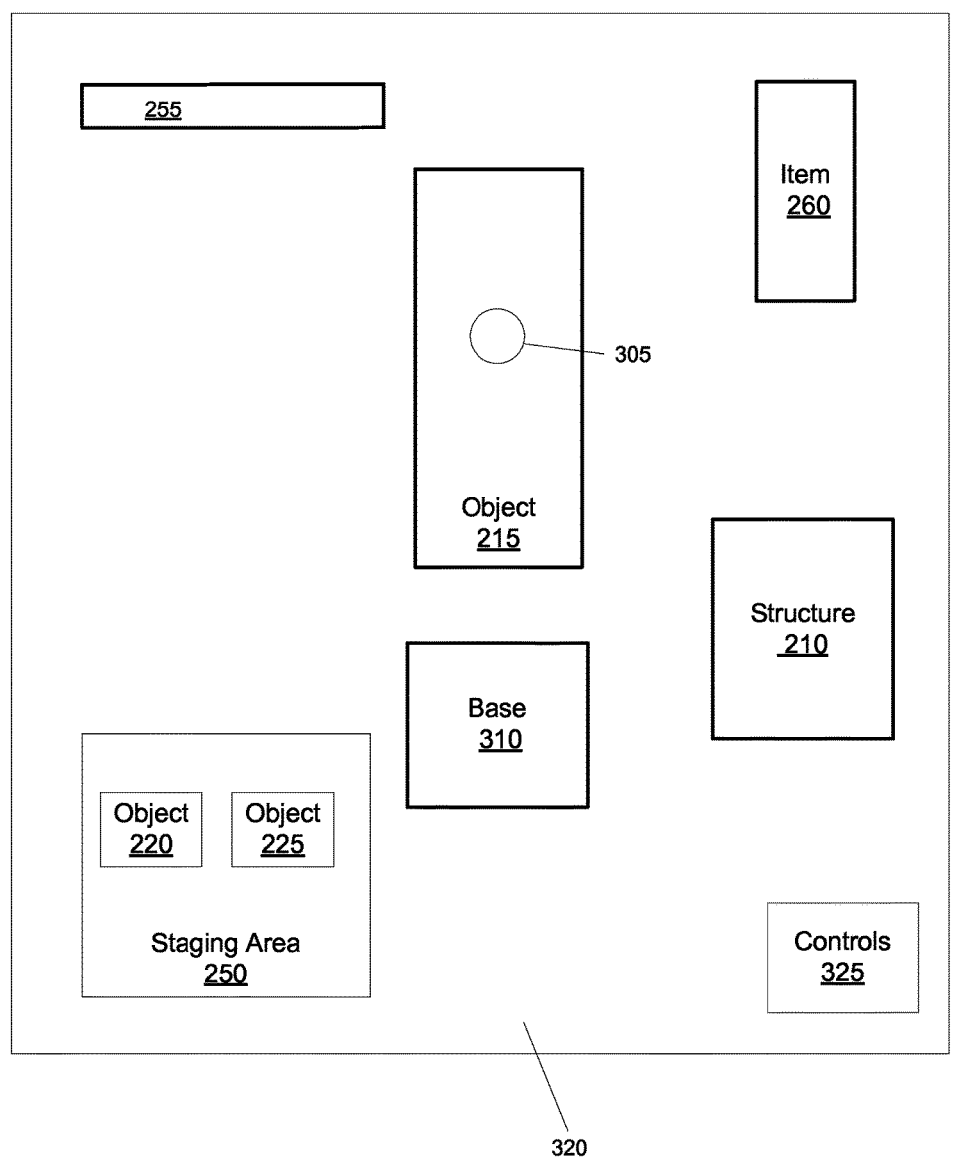
FIG. 3A is a block diagram of a display showing a 3D animation of a view from a jib of a crane in accordance with embodiments of the present technology.

With reference now to FIG. 3A, a block diagram of a display showing a 3D animation of a view from a jib or working arm of a crane, according to various embodiments. View 300 is similar to a top view. The view may be as though an eye or camera was located at the end of the jib looking down on the job site. The view would depict the top of object 215 lifted by crane 205 in a past event with 305 representing the cable or hook from crane 205 attached to object 215. In one embodiment, the view is three dimensional but may appear two dimensional (as depicted) as the point of view is looking down on the job site. However, the angle may be adjusted such that three dimensional objects are more clearly depicted in view 300. View 300 may be useful to review a past event of a blind lift where an object or item obscured the crane operator's line of sight.

Figure 3B:
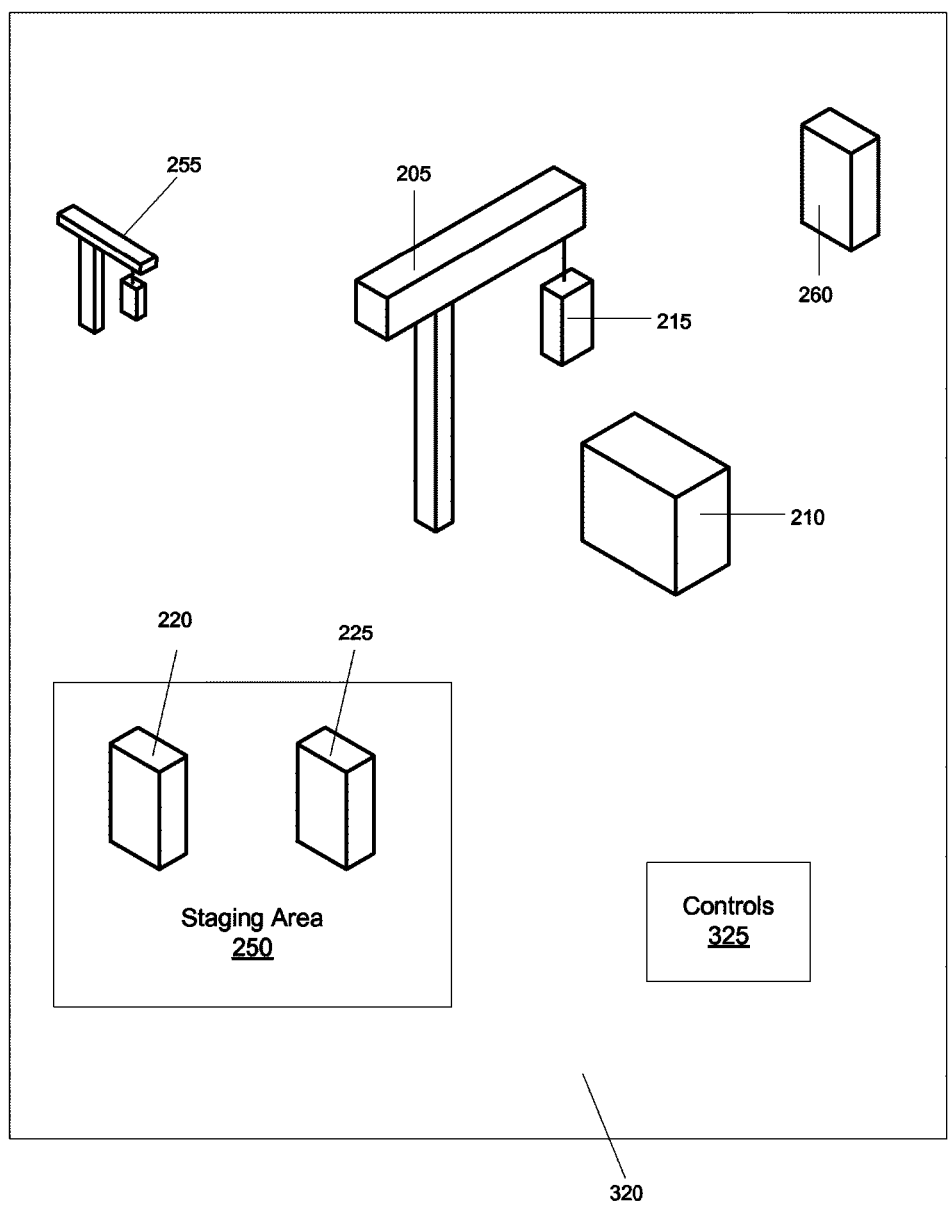
FIG. 3B is a block diagram of a display showing a 3D animation of a bird's eye view in accordance with embodiments of the present technology.

With reference now to FIG. 3B, a block diagram of a display showing a 3D animation of a bird's eye view, according to various embodiments. View 330 is meant to simulate the view of a bird flying over the job site. View 330 depicts how the objects, items and cranes in the job site appear three dimensional in the 3D animation. In one embodiment, crane 205 is moving object 215 from staging area 250 to structure 210. View 330 may be useful to get a big picture of what happened in the job site during the past event.

Figure 3C:
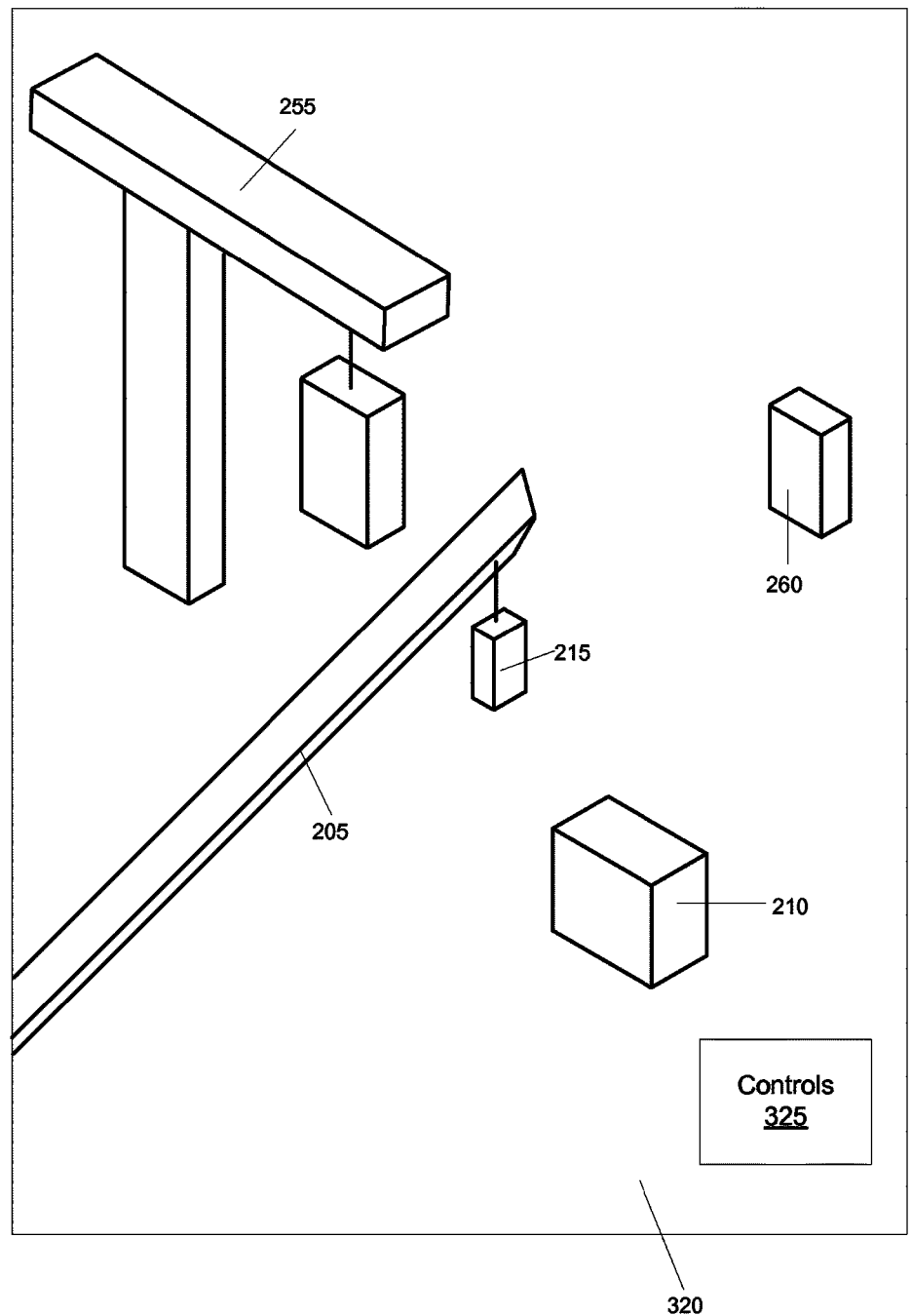
FIG. 3C is a block diagram of a display showing a 3D animation of a view from a cab of a crane in accordance with embodiments of the present technology.

With reference now to FIG. 3C, a block diagram of a display showing a 3D animation of a view from a cab of crane, according to various embodiments. View 340 is meant to simulate the view of the job site from the perspective of the crane operator in the cab of crane 205. View 340 depicts how the working arm of crane 205 extends out from the cab and is lifting object 215. View 330 may be useful to review what the crane operator saw from his or her vantage point during the past event. View 340 may not depict portions of the job site such as what is behind the cab of the crane, but may be useful to focus on what was being lifted.

In one embodiment, the 3D animation may be a remote view of the job site which may share or combine features of views 300, 330, and 400.

With reference now to FIG. 4, a block diagram of a display showing a 3D animation of a view with safety bubbles, according to various embodiments. View 400 may be described as a bird's eye view. Arrow 420 depicts the motion of the working arm of crane 205 as it moves object 215 to be placed on top of structure 410. However, item 405 may be in the path of travel of object 215. In one embodiment, the 3D animation is able to detect that a collision between object 215 and item 405 is either possible, a potential, likely, impending, etc. or that the collision did in fact occur during the past event. The 3D animation then employs safety bubbles to identify the region(s) related to the potential collision or actual collision in the 3D animation. Safety bubbles 415 depict dotted lines around object 215 and a portion of item 405. FIG. 4 depicts dotted lines for the safety bubbles; however the safety bubbles may be depicted in the 3D animation using many different techniques. For example, the safety bubbles may also be shaded or highlighted, and may have a different color, contrast, or brightness than the other portions of the 3D animation. In one embodiment, the highlight region may change as the potential collision changes from a potential collision to an actual collision. For example, a potential collision may be highlighted in yellow and once the collision occurs it is depicted in red.

In one embodiment, the 3D animation, or the hardware and programming behind the animation, may account for or predict the motion of moving objects. For example, object 215 may be moving as it is manipulated by the crane. The movements of the crane, and consequently object 215, may have a limited range of motion or may move in predefined patterns and are thus predictable. The 3D animation may also determine or predict the motion of other items in the job site such as a second crane. Moreover, the 3D animation may determine that an object, item, or structure is stationary and thus does not need to account for its movements. Thus the 3D animation may be able to determine that two objects or items are moving closer together and may potentially collide. The 3D animation may have predetermined limits or measurements to determine when a safety bubble should be displayed. In other words, once two objects are within a predefined proximity to one another, the safety bubble is then displayed. This may depend on the type of object being depicted in the 3D animation or the speed of the object or the closeness of two objects.

In one embodiment, the safety bubbles are warnings of impending collisions and the warnings become progressively more intense as the two objects move closer together. For example, the safety bubble can progressively change color or start to flash as the objects move closer together. In one embodiment, the safety bubble is accompanied by an alert such as an audible noise, text, or indicator light. Such alerts may also grow progressively intense as the two objects move closer together. In one embodiment, the alerts may be sent to other devices such as a device associated with a second crane operator to warn of an impending collision with the first crane. In one embodiment, controls 325 may be used to control the safety bubbles and alerts. For example, the volume of an audible alert may be controlled or the color of a safety bubble.

Operations

Figure 6:
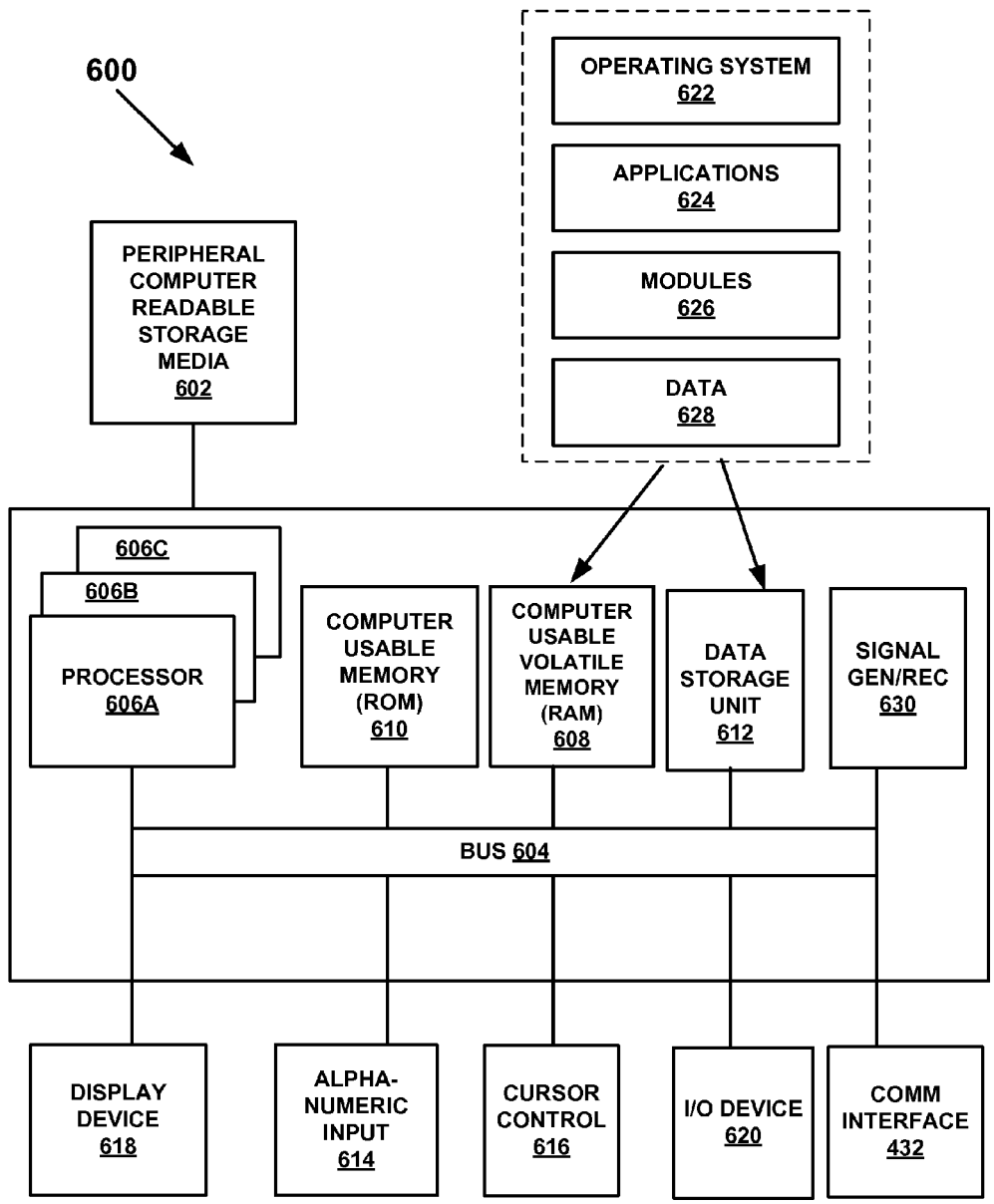
FIG. 6 is a block diagram of an example computer system upon which embodiments of the present technology may be implemented.
Figure 7:
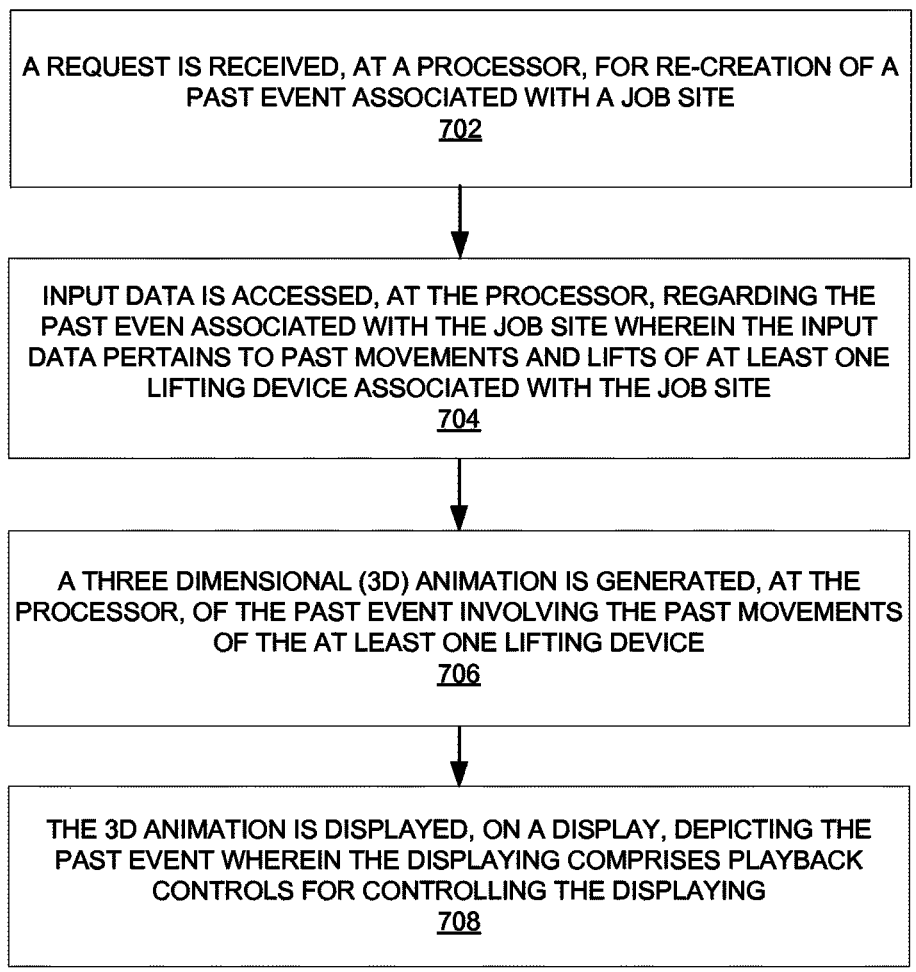
FIG. 7 is a flowchart of a method for a three dimensional animation of a past event, in accordance with an embodiment of the present technology.

With reference to FIG. 7, process 700 is a process for crane productivity coordination. In one embodiment, process 700 is computer implemented methods that are carried out by processors and electrical components under the control of computer readable and computer executable instructions. The computer readable and computer executable instructions reside, for example, in data storage features such as computer usable volatile and non-volatile memory that can be read by a computer. However, the computer readable and computer executable instructions may reside in any type of non-transitory computer readable storage medium. In one embodiment, process 700 is performed by the components of FIG. 1A, 1B, 2, 3A-C, 4, 5, or 6. In one embodiment, the methods may reside in a computer usable storage medium having instructions embodied therein that when executed cause a computer system to perform the method.

At 702, a request is received, at a processor, for re-creation of a past event associated with a job site. The request may be from one computer system to another. The request could be originated by a user or may be originated automatically by a computer system that has detected a collision or other event. An interface may be associated with the 3D animations of the present technology that allows a user to request a replay or a re-creation of a 3D animation for a given time frame and for a particular job site. The request may or may not specify the vantage point or view for the 3D animation of the past event.

At 704, input data is accessed, at the processor, regarding the past even associated with the job site wherein the input data pertains to past movements and lifts of at least one lifting device associated with the job site. The input data may be stored data from the sensors associated with the job site and lifting devices. The input data may be stored locally or remotely and may be stored in a BIM database. In one embodiment, accessing the input data may be accessing a previously rendered 3D animation of the past event. The job site may comprise a plurality of lifting devices such as cranes and a plurality of objects such as building materials, natural environmental features, and partially constructed buildings.

At 706, a three dimensional (3D) animation is generated, at the processor, of the past event involving the past movements of the at least one lifting device. The 3D animation of the past event may or may not have been previously generated. The 3D animation of the past event may simply be replaying the previously rendered 3D animation, may be re-rendering the same 3D animation again, or may be rendering the 3D animation of the past event for the first time based on stored input data. In one embodiment, the 3D rendering is a first instance of rendering the 3D animation of the past event.

In one embodiment, the 3D animation of the past event comprises safety bubbles or alerts warning of potential collisions between objects or of actual collisions between objects. The safety bubbles may be highlighted regions of the 3D animation and may be different colors or shades. In one embodiment, the 3D animation comprises an alert which highlights collisions and near collisions between objects associated with said job site. In one embodiment, the alert comprises an audible sound generated by a speaker associated with the display.

At 708, the 3D animation is displayed, on a display, depicting the past event wherein the displaying comprises playback controls for controlling the displaying. The display may be toggled between different views or vantage points of the job site such as a view from a jib, a bird's eye view of said job site, a view from a cab of said at least one lifting device, and a remote view of said job site. The different views may be referred to as multiple points of view and the 3D animation comprises multiple points of view and wherein the playback controls can toggle between the multiple points of view. The display may also be toggled between the 3D animation of the past event to a live real-time 3D animation of what is currently happening in the job site. At least of the views may not be captured by a video camera of the job site which captures video footage of the past event. Thus the present technology can provide a view of a past event that is not depicted by video footage. In one embodiment, the processor and display are part of a mobile computing system such as a tablet computer, laptop, or smart phone. The processor and display may or may not be part of the same computer system and may be stationary.

GNSS Receiver

With reference now to FIG. 5, a block diagram is shown of an embodiment of an example GNSS receiver which may be used in accordance with various embodiments described herein. In particular, FIG. 5 illustrates a block diagram of a GNSS receiver in the form of a general purpose GPS receiver 580 capable of demodulation of the L1 and/or L2 signal(s) received from one or more GPS satellites. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Further, although L1 and L2 signals are described, they should not be construed as a limitation to the signal type; instead, the use of the L1 and L2 signal(s) is provided merely for clarity in the present discussion.

Although an embodiment of a GNSS receiver and operation with respect to GPS is described herein, the technology is well suited for use with numerous other GNSS signal(s) including, but not limited to, GPS signal(s), Glonass signal(s), Galileo signal(s), and BeiDou signal(s).

The technology is also well suited for use with regional navigation satellite system signal(s) including, but not limited to, Omnistar signal(s), StarFire signal(s), Centerpoint signal(s), Doppler orbitography and radio-positioning integrated by satellite (DORIS) signal(s), Indian regional navigational satellite system (IRNSS) signal(s), quasi-zenith satellite system (QZSS) signal(s), and the like.

Moreover, the technology may utilize various satellite based augmentation system (SBAS) signal(s) such as, but not limited to, wide area augmentation system (WAAS) signal(s), European geostationary navigation overlay service (EGNOS) signal(s), multi-functional satellite augmentation system (MSAS) signal(s), GPS aided geo augmented navigation (GAGAN) signal(s), and the like.

In addition, the technology may further utilize ground based augmentation systems (GBAS) signal(s) such as, but not limited to, local area augmentation system (LAAS) signal(s), ground-based regional augmentation system (GRAS) signals, Differential GPS (DGPS) signal(s), continuously operating reference stations (CORS) signal(s), and the like.

Although the example herein utilizes GPS, the present technology may utilize any of the plurality of different navigation system signal(s). Moreover, the present technology may utilize two or more different types of navigation system signal(s) to generate location information. Thus, although a GPS operational example is provided herein it is merely for purposes of clarity.

In one embodiment, the present technology may be utilized by GNSS receivers which access the L1 signals alone, or in combination with the L2 signal(s). A more detailed discussion of the function of a receiver such as GPS receiver 580 can be found in U.S. Pat. Nos. 5,621,426 5,621,426, by Gary R. Lennen, entitled "Optimized processing of signals for enhanced cross-correlation in a satellite positioning system receiver," incorporated by reference which includes a GPS receiver very similar to GPS receiver 580 of FIG. 5.

In FIG. 5, received L1 and L2 signal is generated by at least one GPS satellite. Each GPS satellite generates different signal L1 and L2 signals and they are processed by different digital channel processors 552 which operate in the same way as one another. FIG. 5 shows GPS signals (L1=1575.42 MHz, L2=1227.60 MHz) entering GPS receiver 580 through a dual frequency antenna 501. Antenna 501 may be a magnetically mountable model commercially available from Trimble® Navigation of Sunnyvale, Calif., 94085. Master oscillator 548 provides the reference oscillator which drives all other clocks in the system. Frequency synthesizer 538 takes the output of master oscillator 548 and generates important clock and local oscillator frequencies used throughout the system. For example, in one embodiment frequency synthesizer 538 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 534 performs filtering and low noise amplification of both L1 and L2 signals. The noise figure of GPS receiver 580 is dictated by the performance of the filter/LNA combination. The downconverter 536 mixes both L1 and L2 signals in frequency down to approximately 175 MHz and outputs the analogue L1 and L2 signals into an IF (intermediate frequency) processor 30. IF processor 550 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 552 inputs the digitally sampled L1 and L2 inphase and quadrature signals. All digital channel processors 552 are typically identical by design and typically operate on identical input samples. Each digital channel processor 552 is designed to digitally track the L1 and L2 signals produced by one satellite by tracking code and carrier signals and to form code and carrier phase measurements in conjunction with the microprocessor system 554. One digital channel processor 552 is capable of tracking one satellite in both L1 and L2 channels.

Microprocessor system 554 is a general purpose computing device which facilitates tracking and measurements processes, providing pseudorange and carrier phase measurements for a navigation processor 558. In one embodiment, microprocessor system 554 provides signals to control the operation of one or more digital channel processors 552. Navigation processor 558 performs the higher level function of combining measurements in such a way as to produce position, velocity and time information for the differential and surveying functions. Storage 560 is coupled with navigation processor 558 and microprocessor system 554. It is appreciated that storage 560 may comprise a volatile or non-volatile storage such as a RAM or ROM, or some other computer readable memory device or media.

One example of a GPS chipset upon which embodiments of the present technology may be implemented is the Maxwell™ chipset which is commercially available from Trimble® Navigation of Sunnyvale, Calif., 94085.

Computer System

With reference now to FIG. 6, portions of the technology for providing a communication composed of computer-readable and computer-executable instructions that reside, for example, in non-transitory computer readable storage media of a computer system. That is, FIG. 6 illustrates one example of a type of computer that can be used to implement embodiments of the present technology. FIG. 6 represents a system or components that may be used in conjunction with aspects of the present technology. In one embodiment, some or all of the components of FIGS. 1A, 1B, 2, 3A, 3B, 3C, 4, and 5 may be combined with some or all of the components of FIG. 6 to practice the present technology.

FIG. 6 illustrates an example computer system 600 used in accordance with embodiments of the present technology. It is appreciated that system 600 of FIG. 6 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 6, computer system 600 of FIG. 6 is well adapted to having peripheral computer readable media 602 such as, for example, a floppy disk, a compact disc, and the like coupled thereto.

System 600 of FIG. 6 includes an address/data bus 604 for communicating information, and a processor 606A coupled to bus 604 for processing information and instructions. As depicted in FIG. 6, system 600 is also well suited to a multi-processor environment in which a plurality of processors 606A, 606B, and 606C are present. Conversely, system 600 is also well suited to having a single processor such as, for example, processor 606A. Processors 606A, 606B, and 606C may be any of various types of microprocessors. System 600 also includes data storage features such as a computer usable volatile memory 608, e.g. random access memory (RAM), coupled to bus 604 for storing information and instructions for processors 606A, 606B, and 606C.

System 600 also includes computer usable non-volatile memory 610, e.g. read only memory (ROM), coupled to bus 604 for storing static information and instructions for processors 606A, 606B, and 606C. Also present in system 600 is a data storage unit 612 (e.g., a magnetic or optical disk and disk drive) coupled to bus 604 for storing information and instructions. System 600 also includes an optional alphanumeric input device 614 including alphanumeric and function keys coupled to bus 604 for communicating information and command selections to processor 606A or processors 606A, 606B, and 606C. System 600 also includes an optional cursor control device 616 coupled to bus 604 for communicating user input information and command selections to processor 606A or processors 606A, 606B, and 606C. System 600 of the present embodiment also includes an optional display device 618 coupled to bus 604 for displaying information.

Referring still to FIG. 6, optional display device 618 of FIG. 6 may be a liquid crystal device, cathode ray tube, plasma display device, light emitting diode (LED) light-bar, or other display device suitable for creating graphic images and alpha-numeric characters recognizable to a user. Optional cursor control device 616 allows the computer user to dynamically signal the movement of a visible symbol (cursor) on a display screen of display device 618. Many implementations of cursor control device 616 are known in the art including a trackball, mouse, touch pad, joystick or special keys on alpha-numeric input device 614 capable of signaling movement of a given direction or manner of displacement. Alternatively, it will be appreciated that a cursor can be directed and/or activated via input from alpha-numeric input device 614 using special keys and key sequence commands.

System 600 is also well suited to having a cursor directed by other means such as, for example, voice commands. System 600 also includes an I/O device 620 for coupling system 600 with external entities. For example, in one embodiment, I/O device 620 is a modem for enabling wired or wireless communications between system 600 and an external network such as, but not limited to, the Internet. A more detailed discussion of the present technology is found below.

Referring still to FIG. 6, various other components are depicted for system 600. Specifically, when present, an operating system 622, applications 624, modules 626, and data 628 are shown as typically residing in one or some combination of computer usable volatile memory 608, e.g. random access memory (RAM), and data storage unit 612. However, it is appreciated that in some embodiments, operating system 622 may be stored in other locations such as on a network or on a flash drive; and that further, operating system 622 may be accessed from a remote location via, for example, a coupling to the internet. In one embodiment, the present technology, for example, is stored as an application 624 or module 626 in memory locations within RAM 608 and memory areas within data storage unit 612. The present technology may be applied to one or more elements of described system 600.

System 600 also includes one or more signal generating and receiving device(s) 630 coupled with bus 604 for enabling system 600 to interface with other electronic devices and computer systems. Signal generating and receiving device(s) 630 of the present embodiment may include wired serial adaptors, modems, and network adaptors, wireless modems, and wireless network adaptors, and other such communication technology. The signal generating and receiving device(s) 630 may work in conjunction with one or more communication interface(s) 632 for coupling information to and/or from system 600. Communication interface 632 may include a serial port, parallel port, Universal Serial Bus (USB), Ethernet port, antenna, or other input/output interface. Communication interface 632 may physically, electrically, optically, or wirelessly (e.g. via radio frequency) couple system 600 with another device, such as a cellular telephone, radio, or computer system.

The computing system 600 is only one example of a suitable computing environment and is not intended to suggest any limitation as to the scope of use or functionality of the present technology. Neither should the computing environment be interpreted as having any dependency or requirement relating to any one or combination of components illustrated in the example computing system 600.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A method for rendering a three dimensional animation of a past event, said method comprising:
   collecting input data from at least one sensor associated with at least one lifting device at a job site, wherein said input data represents past movements and lifts of said at least one lifting device performed at said job site;
   receiving a request, at a processor, for re-creation of said past event associated with said at least one lifting device at said job site;
   accessing said input data, at said processor, regarding said past event associated with said at least one lifting device at said job site;
   generating a three dimensional (3D) animation, at said processor, of said past event involving said past movements of said at least one lifting device; and
   displaying said 3D animation, on a display, depicting said past event wherein said displaying comprises playback controls for controlling said displaying.

2. The method as recited in claim 1 wherein said generating said 3D animation is a first instance of rendering said 3D animation of said past event.

3. The method as recited in claim 1 wherein said generating said 3D animation accesses a previously rendered 3D animation of said past event and said displaying is a replay of said previously rendered 3D animation of said past event.

4. The method as recited in claim 1 wherein said 3D animation comprises a plurality of lifting devices associated with said job site and at least one partially constructed building.

5. The method as recited in claim 1 wherein said 3D animation comprises an alert which highlights collisions and near collisions between objects associated with said job site.

6. The method as recited in claim 5 wherein said alert is a shaded region of said 3D animation which highlights said collisions and said near collisions.

7. The method as recited in claim 5 wherein said alert comprises an audible sound generated by a speaker associated with said display.

8. The method as recited in claim 1 wherein said playback controls can toggle between said 3D animation of said past event and a live real-time 3D animation of said job site.

9. The method as recited in claim 1 wherein said 3D animation comprises multiple points of view and wherein said playback controls can toggle between said multiple points of view.

10. The method as recited in claim 9 wherein said multiple points of view are selected from the group of multiple points of view consisting of: a view from a jib, a bird's eye view of said job site, a view from a cab of said at least one lifting device, and a remote view of said job site.

11. The method as recited in claim 1 wherein said processor and said display are components of a mobile computing device.

12. The method as recited in claim 1 wherein said lifting device is a crane wherein said crane is selected from the group of cranes consisting of: a tower crane, a luffing crane, a level luffing crane, a fixed crane, a mobile crane, a self-erecting crane, a crawler crane, and a telescopic crane.

13. The method as recited in claim 1 wherein said displaying displays a point of view that is not captured by a video camera.

14. A non-transitory computer readable storage medium having instructions embodied therein that when executed cause a computer system to perform a method for rendering a three dimensional animation of a past event, said method comprising:
    collecting input data from at least one sensor associated with at least one lifting device at a job site, wherein said input data represents past movements and lifts of said at least one lifting device performed at said job site;
    receiving a request for re-creation of said past event associated with said at least one lifting device at said job site;
    accessing input data regarding said past even associated with said at least one lifting device at said job site;
    generating a three dimensional (3D) animation of said past event involving said past movements of said at least one lifting device; and
    displaying said 3D animation depicting said past event wherein said displaying comprises playback controls for controlling said displaying.

15. The non-transitory computer readable storage medium as recited in claim 14 wherein said generating said 3D animation is a first instance of rendering said 3D animation of said past event.

16. The non-transitory computer readable storage medium as recited in claim 14 wherein said generating said 3D animation accesses a previously rendered 3D animation of said past event and said displaying is a replay of said previously rendered 3D animation of said past event.

17. The non-transitory computer readable storage medium as recited in claim 14 wherein said 3D animation comprises a plurality of lifting devices associated with said job site and at least one partially constructed building.

18. The non-transitory computer readable storage medium as recited in claim 14 wherein said 3D animation comprises an alert which highlights collisions and near collisions between objects associated with said job site.

19. The non-transitory computer readable storage medium as recited in claim 18 wherein said alert is a shaded region of said 3D animation which highlights said potential collisions.

20. The non-transitory computer readable storage medium as recited in claim 18 wherein said alert comprises an audible sound generated by a speaker.

21. The non-transitory computer readable storage medium as recited in claim 14 wherein said playback controls can toggle between said 3D animation of said past event and a live real-time 3D animation of said job site.

22. The non-transitory computer readable storage medium as recited in claim 14 wherein said 3D animation comprises multiple points of view and wherein said playback controls can toggle between said multiple points of view.

23. The non-transitory computer readable storage medium as recited in claim 22 wherein said multiple points of view are selected from the group of multiple points of view consisting of: a view from a jib, a bird's eye view of said job site, a view from a cab of said at least one lifting device, and a remote view of said job site.

24. The non-transitory computer readable storage medium as recited in claim 14 wherein said lifting device is a crane wherein said crane is selected from the group of cranes consisting of: a tower crane, a luffing crane, a level luffing crane, a fixed crane, a mobile crane, a self-erecting crane, a crawler crane, and a telescopic crane.

25. The non-transitory computer readable storage medium as recited in claim 14 wherein said displaying displays a point of view that is not captured by a video camera.

26. A system for rendering a three dimensional animation of a past event, said system comprising:
    a plurality of sensors for collecting input data for a past event associated with at least one lifting device at a job site, wherein said input data represents past movements and lifts of said at least one lifting device performed at said job site;
    a processor for receiving a request for re-creation of said past event associated with said at least one lifting device at said job site, accessing said input data regarding said past event associated with said at least one lifting device at said job site, and generating a three dimensional (3D) animation of said past event involving said past movements of said at least one lifting device; and
    a display for displaying said 3D animation with playback controls for controlling said displaying.

27. The system as recited in claim 26 wherein said generating said 3D animation is a first instance of rendering said 3D animation of said past event.

28. The system as recited in claim 26 wherein said generating said 3D animation accesses a previously rendered 3D animation of said past event and said displaying is a replay of said previously rendered 3D animation of said past event.

29. The system as recited in claim 26 wherein said 3D animation comprises an alert which highlights collisions and near collisions between objects associated with said job site.

30. The system as recited in claim 29 wherein said alert is a shaded region of said 3D animation which highlights said potential collisions.

31. The system as recited in claim 29 wherein said alert comprises an audible sound generated by a speaker associated with said display.

32. The system as recited in claim 26 wherein said playback controls can toggle between said 3D animation of said past event and a live real-time 3D animation of said job site.

33. The system as recited in claim 26 wherein said system is a mobile computing device.

34. The system as recited in claim 26 wherein said lifting device is a crane wherein said crane is selected from the group of cranes consisting of: a tower crane, a luffing crane, a level luffing crane, a fixed crane, a mobile crane, a self-erecting crane, a crawler crane, and a telescopic crane.

* * * * *